United States Patent [19]

Suzuki

[11] Patent Number: 5,004,440
[45] Date of Patent: Apr. 2, 1991

[54] PRESSURE CONTROL VALVE

[75] Inventor: Akira Suzuki, Aichi, Japan

[73] Assignee: Aisin AW Kabushiki Kaisha, Japan

[21] Appl. No.: 444,435

[22] Filed: Dec. 1, 1989

[30] Foreign Application Priority Data

Dec. 30, 1988 [JP] Japan .................................. 63-335291

[51] Int. Cl.⁵ ............................................ F15B 13/044
[52] U.S. Cl. .......................... 137/625.65; 251/129.16; 251/129.18
[58] Field of Search .............. 137/625.65; 251/129.16, 251/129.18

[56] References Cited

U.S. PATENT DOCUMENTS

| 1,939,912 | 12/1933 | McNeal | 251/337 |
|---|---|---|---|
| 3,749,128 | 7/1973 | Sallberg et al. | 137/625.65 X |
| 3,858,135 | 12/1974 | Gray | 137/625.65 X |
| 4,635,683 | 1/1987 | Nielsen | 137/625.65 |
| 4,f838,313 | 6/1989 | Kobayashi et al. | 137/625.65 |
| 4,838,517 | 6/1989 | Miki et al. | 137/625.65 X |
| 4,838,518 | 6/1989 | Kobayashi et al. | 137f/625.65 X |

FOREIGN PATENT DOCUMENTS

| 254483 | 1/1988 | European Pat. Off. | 137/625.65 |
|---|---|---|---|
| 2117872 | 10/1983 | United Kingdom | 137/625.65 |

*Primary Examiner*—Gerald A. Michalsky
*Attorney, Agent, or Firm*—Lorusso & Loud

[57] ABSTRACT

A pressure control valve includes a spool valve slidable in a valve sleeve having a supply port, an output port and an exhaust port, and adapted to receive a load caused by an electromagnet and applies through a push rod, a spring load, and an output pressure feedback load. The balance among the loads is arranged to control the output pressure at a level corresponding to the electric signal input to the electromagnet. Provision is made for preselecting the gradient of the attractive force of the electromagnet with respect to the stroke of a plunger slidable within the core of the electromagnet and for adjusting the axial position of the plunger. Specifically, the electromagnet includes a coil assembly, a cylindrical core having an axially extending opening through which receives the push rod, and a cup-shaped plunger fixed to one end of the push rod and covering the core. The inner cylindrical surface of the cup-shaped plunger is tapered to converge toward the bottom of the plunger. The push rod position is adjusted by bringing the tip of the push rod into contact with a screw member threaded into a hole in a cylindrical portion extending from the center for a cover of the electromagnet portion. The push rod axial position is adjusted by inserting a ring between the mutually confronting tips of the push rod and a distal column portion of the spool valve.

8 Claims, 7 Drawing Sheets

PRESSURE CONTROL VALVE

BACKGROUND OF THE INVENTION

The present invention relates to a pressure control valve, and, more particularly, to an electromagnetic pressure control valve capable of controlling fluid pressure in response to an electric signal.

Pressure control valves are represented by a diaphragm type pressure control valve wherein the surface of the diaphragm receives feedback pressure and a spool type pressure control valve wherein the end surface of the spool which receives feedback pressure. The present invention relates to an electromagnetic pressure-control valve of the spool type.

The spool type electromagnetic pressure-control valve is usually designed in such a manner that a load caused by the electromagnet, a spring load, and an output pressure feedback load to act on a spool valve which slides in a valve sleeve having a supply port, an output port, and an exhaust port. Its structure is arranged such that the output is controlled to a level which corresponds to the electric signal input to the electromagnet portion by arranging the balance among the above-described loads (see Japanese Utility Model Laid-Open No. 60-52509).

Figure 1:
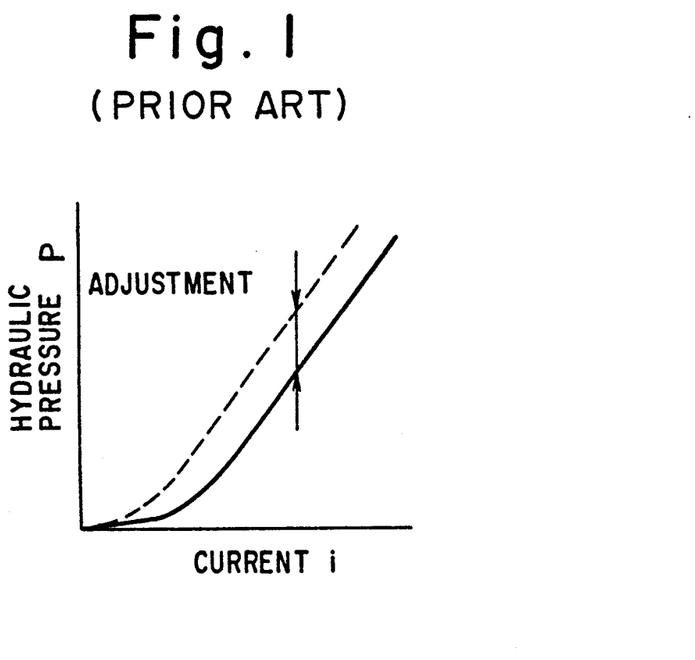
FIG. 1 is a graph showing the characteristic of a conventional pressure control valve that is determined by the relationship between current supplied to the solenoid and the output hydraulic pressure.

Such a conventional spool type electromagnetic pressure-control valve is provided with a mechanism for adjusting the associated balancing spring. This mechanism allows the current vs. the hydraulic pressure characteristic of the control valve which is determined by the relationship between current supplied to the solenoid and the hydraulic pressure (output pressure) to be adjusted in parallel displacement, as shown in FIG. 1.

With the above-described adjustment, however, although the parallel displacement of the characteristic curve is possible, the gradient of the current vs. the hydraulic pressure characteristic curve cannot be adjusted.

This will be explained in detail with reference to FIG. 2.

Figure 2:
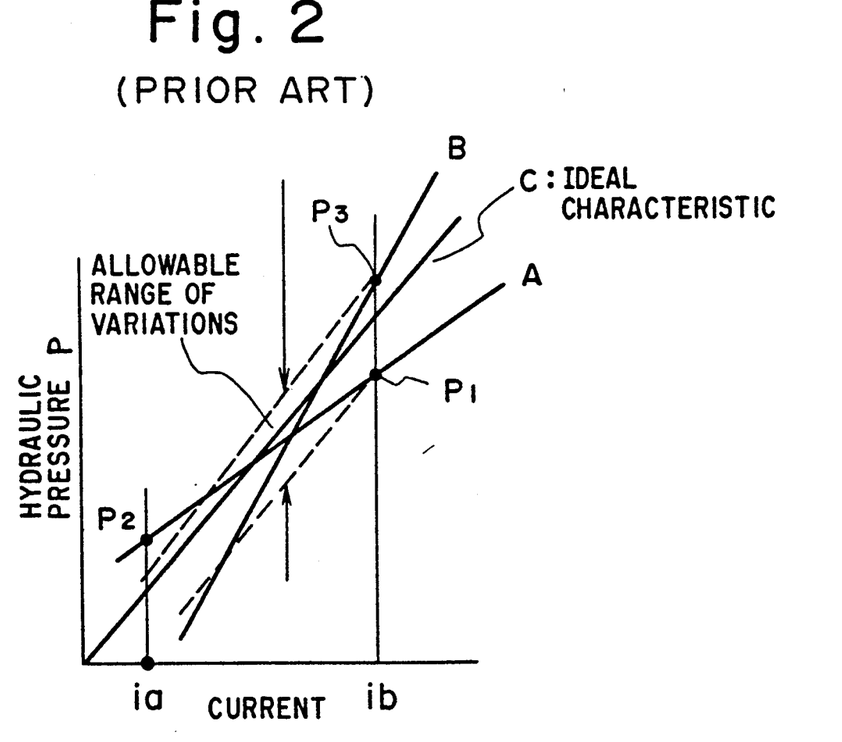
FIG. 2 is a graph illustrating a problem encountered with the prior art.

The conventional practice is to adjust the load on the balancing spring in such a manner that the hydraulic pressure corresponding to the current value $i_b$ supplied to the solenoid falls within an allowable range of a given standard, i.e., the range between the broken lines shown in FIG. 2. However, when the control valve possesses a characteristic with a small gradient, such as the characteristic A, even if an adjustment point is set at the hydraulic pressure $P_1$ which corresponds to the current value $i_b$ at the lower limit of the allowable range of the standard, the hydraulic pressure $P_2$ outside the range corresponds to the current value $i_a$ when this current is supplied to the solenoid. Therefore, such control valves fail to meet the given standard. Similarly, when the control valve possesses a characteristic with a steep gradient, such as the characteristic B, even if an adjustment point is set at the hydraulic pressure $P_3$ which corresponds to the current value $i_b$ at the upper limit of the allowable range, the hydraulic pressure corresponding to the current value $i_a$ would be outside the allowable range.

In view of the above-described circumstances, there is the risk that spool type electromagnetic pressure-control valves unable to meet standard may be produced in large numbers, particularly when they are mass-produced. This may lead to an increase in the proportion in which defective products are produced.

In order to avoid an increase in the proportion of defective products produced, it is necessary to restrict variations in the gradient of the current vs. the attractive force characteristic of the solenoid portion. This has hitherto called for improvement in the level of dimensional precision of various component parts, and has led to increase in production cost.

SUMMARY OF THE INVENTION

An object of the present invention is to provide a pressure control valve capable of overcoming the above-described problems experienced with the conventional pressure control valves, which allows variation in the gradient of the current vs. the attractive force characteristic of the solenoid portion to be restricted without requiring any particular improvement in the dimensional precision of various component parts. The pressure control valve is thus inexpensive but capable of precise control of hdyraulic pressure.

In order to achieve the above-described object, a pressure control valve according to the present invention comprises a valve sleeve having a supply port, an output port, and an exhaust port. A spool valve is slidably mounted in the valve sleeve and receives a load caused by an electromagnet and applied through a push rod, a spring load, and an output pressure feedback load. The valve further includes portion including the electromagnet and a plunger, and provision for input thereto of an electric signal. The balance among the above-described loads is arranged in such a manner that the supply pressure to be outputted is controlled to a level which corresponds to the electric signal input to the electromagnet portion. The pressure control valve further comprises a means for preselecting the gradient of the attractive force of the electromagnet portion with respect to the stroke of the plunger, and a means for adjusting the axial position of the plunger.

Specifically, the electromagnet portion further includes a coil assembly, a cylindrical core having an axial center portion through which the push rod passes, and a cup-shaped plunger fixed to one end of the push rod and covering the cylindrical core. The inner peripheral surface of the cup-shaped plunger forms a tapering surface converging toward the bottom of the cup-shaped plunger.

The position of the push rod is adjusted by screwing a screw member into a through hole of a cylindrical portion in the center of a cover for the electromagnet portion, and by bringing the tip of the screw into contact with the rightside right end of the push rod. After the position of the push rod has been adjusted in this way, the cylindrical portion is crimped, thereby fixing the screw member to the cylindrical portion.

Further, the axial position of the push rod is adjusted by interposing an E-shaped ring between the left end tip of the push rod and the tip of a column portion of the spool valve which is at the right end of the valve sleeve.

Thus, according to the present invention, by virtue of the preselecting of the gradient of the attractive force of the electromagnet portion with respect to the stroke of the plunger, and by virtue of the provision of a mechanism for adjusting the axial position of the plunger, variations in current vs. hydraulic pressure characteristic between pressure control valves can be easily compensated for.

Figure 10:
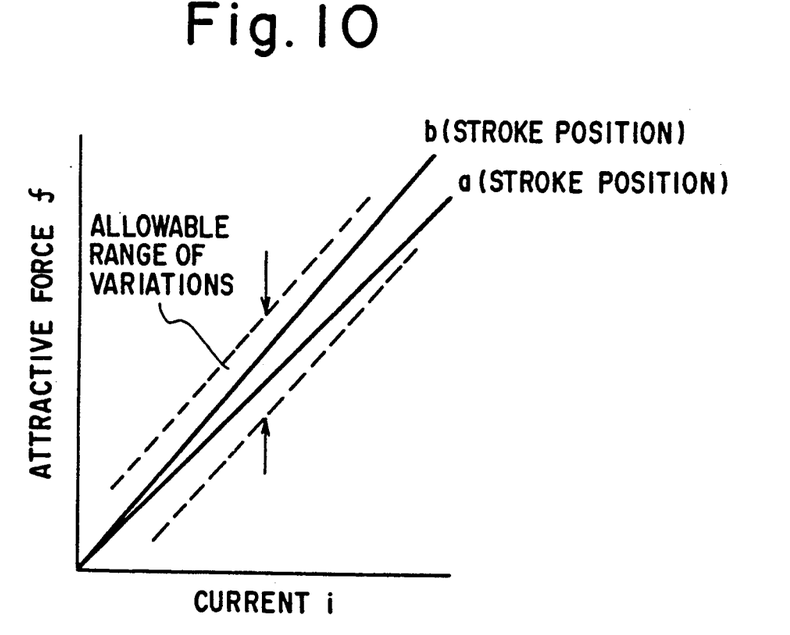
FIG. 10 is a graph showing the characteristic achievable by the present invention in the relationship between the current and the attractive force, with the stroke being used as the variable parameter.

Accordingly, the current vs. the attractive force characteristic of the solenoid portion can be corrected, as shown in FIG. 10. As a result, variations in the current vs. the hydraulic pressure characteristic of pressure control valves ar confined to within the allowable range.

BRIEF DESCRIPTION OF THE DRAWINGS

FIGS. 11 (a) and (b) are views used to explain the electromagnet portion of the control valve of FIG. 3;

DESCRIPTION OF PREFERRED EMBODIMENTS

The preferred embodiments of the present invention will now be described in detail with reference to the drawings.

Figure 3:
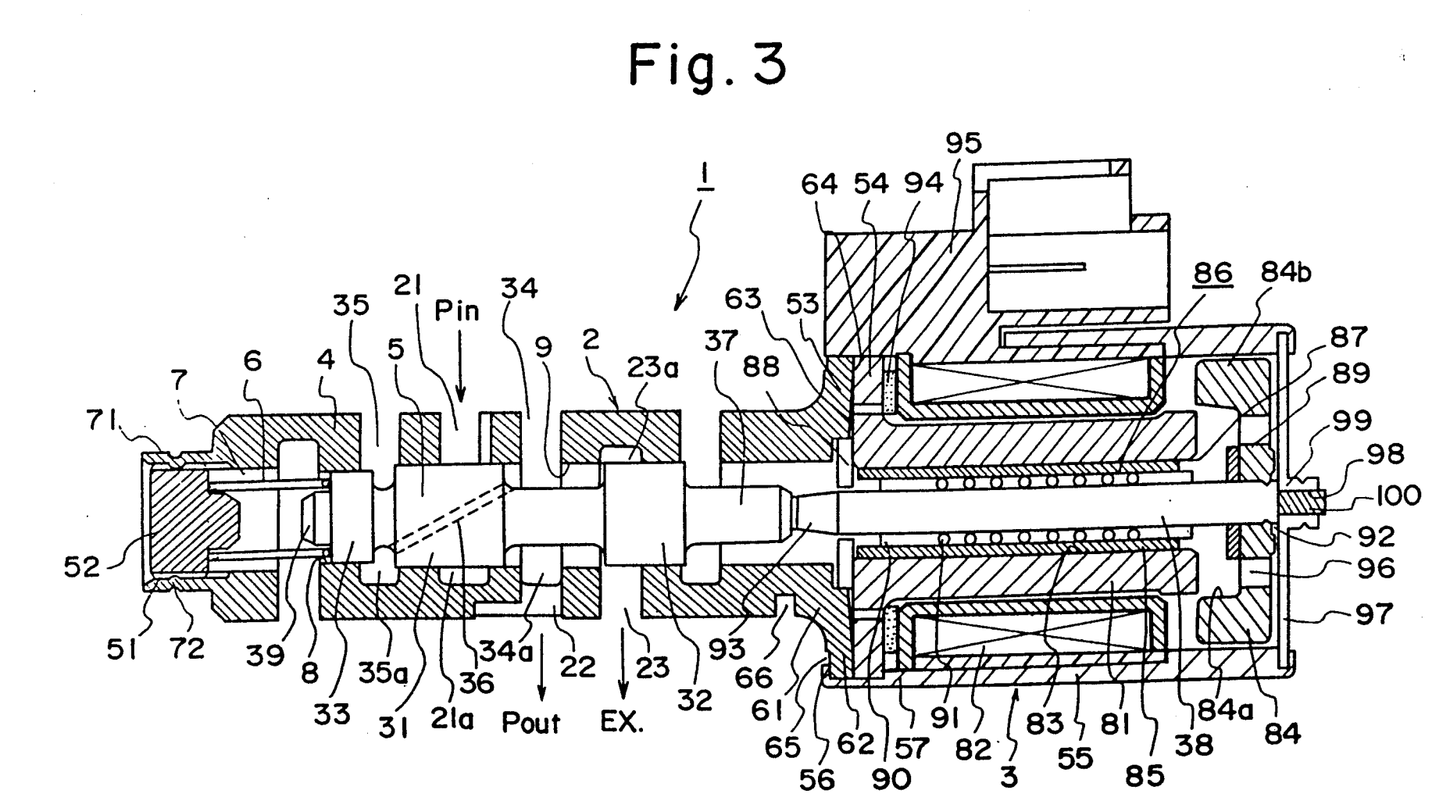
FIG. 3 is a sectional view illustrating a first embodiment of a pressure control valve according to the present invention.

Referring to FIG. 3, a pressure control valve 1 is shown as including a pressure governing valve portion 2 and an electromagnet portion 3. The pressure governing valve portion 2 comprises a valve sleeve 4 and a spool valve 5. A large-diameter hole 7 accommodating a spring 6, and, next to it, a small-diameter guide hole 8 and an intermediate-diameter guide hole 9 for guiding the spool sliding movement of the valve 5 are formed axially through the valve sleeve 4.

A supply port 21, an output port 22, and an exhaust port 23 which open radially outward are successively formed in the sequential order described above from left to right when viewed in the drawing through the outer surface of the valve sleeve 4 at positions communicating with the above-described guide hole 9. In order to make the flow of fluid smooth at each of the ports 21, 22 and 23, annular cutout portions 21a, 23a, 34a, and 35a are, if necessary, provided.

The spool valve 5 has two land portions 31 and 32 having the same diameter which are intimately guided by sliding contact with the above-described intermediate-diameter guide hole 9, the spool valve 5 further having a small-diameter land portion 33 formed next to the land portion 31 which is in intimate sliding contact with the small-diameter guide hole 8. The distance between the mutually opposing ends of the two land portions 31 and 32 having the same diameter is so determined as to enable the output port 22 to alternately communicate with the supply port 21 and the exhaust port 23 at a predetermined ratio as the spool valve 5 slides. A space 34 formed between the same-diameter land portions 31 and 32 is always connected to the output port 22.

A closed space 35 formed by the land portion 31, the small-diameter land portion 33, and guide holes 8 and 9 is connected to the space 34 formed between the land portions 31 and 32 by a feedback oil passage 36. The feedback oil passage 36 is arranged to diagonally penetrate the land portion 31 so that output pressure obtained at the output port 22 is fed back to the closed space 35.

A column portion 37 projecting from the central portion of the second end surface (i.e., the right-side end face when viewed in the drawing) of the land portion 32 is arranged for contact with a push rod 38 of the electromagnet portion 3, described later, while a guide member 39 projecting from the central portion of the end surface of the small-diameter land portion 33 receives one end of the above-described spring 6.

In order to adjust the load on the spring 6, the hole 7 formed through the valve sleeve 4 has female threads 51 formed therein, and a male screw member 52 which is adapted to mate with the female screw member 51 is inserted therein. As a result, the spring 6 can be abutted against the end surface of the spool valve 5 by screwing the male screw member 52 into the hole 7. Therefore, the degree of compression of the spring 6 can be varied by rotation of the male screw member 52.

When the pressure governing valve 2 is assembled, first the spool valve 5 is inserted into the valve sleeve 4, with the small-diameter land portion 33 positioned at an end portion where the small-diameter guide hole 8 is formed. On the other hand, the spring 6 is inserted into the valve sleeve 4 from the side where the large-diameter hole 7 opens, in such a manner as to come into contact with the end surface of the small-diameter land portion 33 while surrounding the guide member 39. The spring 6 in its retained condition is compressed to a predetermined degree by rotation of the male screw member 52 in the female threads 51.

The pressure governing valve portion 2 thus assembled can be coupled with the electromagnet portion 3 by abutting a flange portion 53 formed at an end portion of the valve sleeve 4 adjacent to the intermediate-diameter guide hole 9 with a flange portion 54 of the electromagnet portion 3, which will be described later, and by curling over an end portion 56 of the case 55 of the electromagnet portion 3. In order to easily curl the end portion 56 of the case 55, a stepped portion 57 is formed on the inner surface of the case 55 at a position confronting the flange portion 54. Thus, the curling is conducted with the flange portion 54 positioned on the shoulder portion of the stepped portion 57.

The flange portion 53 is constituted by a thick wall portion 61 and a thin wall portion 62, the thick wall portion 61 preventing a radially tapered portion 63 at at the face of the flange. The tapered portion 63 is provided for the purpose of forming a recess or gap between the flange portion 53 and the flange portion 54. That is, the two flange portions 53 and 54 are caused to come into contact with each other at only their peripheral portions 64 located radially outward of the recessed portion thus formed. Therefore, only the periphery portions 64 need to be subjected to a surface working when the two flange portions 53 and 54 are to be brought into contact with each other. This enables the assembling work to be conducted easily and accurately.

The periphery portion of the above-described thin wall portion 62 has an annular step 65. The annular step portion 65 is provided for the purpose of shortening the length of the assembled pressure control valve 1. That is, since the pressure control valve 1 is to be installed in a limited space, it must be shortened to the extent possible. Therefore, it is preferable that the thickness of each of the flange portions 53 and 54 be reduced as much as possible. However, it is very difficult for the thickness of each of the two flange portions 54 and 54 to be reduced since their strength is thereby weakened. In order to overcome the problem, the thick wall portion 61 is arranged to have a certain thickness and the above-described annular step portion 65 is formed in the thin wall portion 62 which is integral with the thick wall portion 61. As a result, the length of the completed electromagnet portion 3 can be shortened by a degree corresponding to the size of the annular step portion 65.

A cutout 66 is provided for the purpose of aligning the supply port 21, the output port 22, and the exhaust port 23 with for example, a hydraulic pressure control system for an automatic transmission of an automobile (omitted from illustration).

After the pressure governing valve portion 2 and the electromagnet portion 3 have been coupled to each other, the above-described male screw member 52 is rotated for movement relative to the female screw member 51. The adjustment of the degree of compression of the spring 6 is performed with an electric current supplied to the electromagnet portion 3 and with pressure output from the output port 22 supervised. After the adjustment has been completed, a projecting portion 71 in which the female screw member 51 is formed is crimped from outside as designated by reference numeral 72 so that the male screw member 52 is fixed in place. In order to easily crimp, a portion of the above-described projecting portion 71 is formed with a thin wall.

Next, the electromagnet portion 3 will be described.

The electromagnet portion 3 is filled with hydraulic oil for use in the hydraulic pressure control system in order to prevent hydraulic pressure vibrations at high temperature. The thus enclosed hydraulic oil causes no problem during the driving of an automobile at high temperature in hot season or the like. However, the hydraulic oil becomes a resistance against the movement of the movable portion in the electromagnet portion 3 such as the push rod 38 or the plunger 84 when an automobile is driven at low temperature in a cold season or the like.

Figures 4, 5:
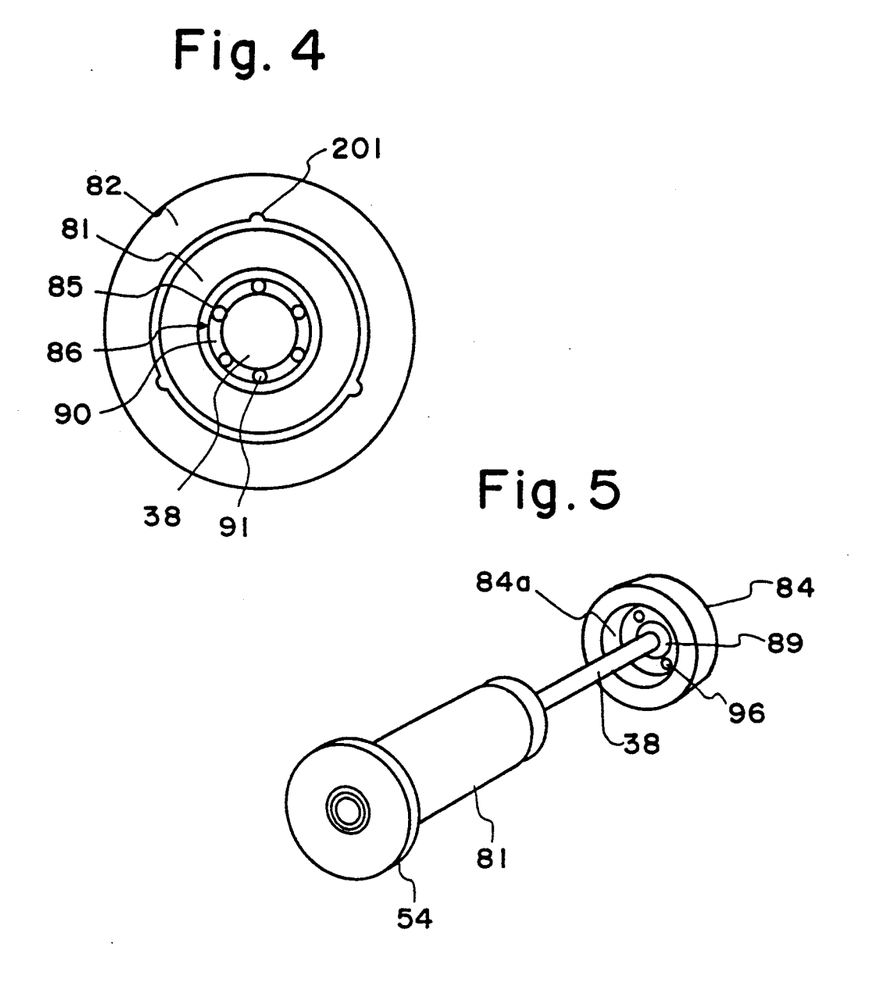
FIG. 4 is a sectional view of an electromagnet portion of the control valve of FIG. 3.
FIG. 5 is a perspective view illustrating a core and a plunger of the control valve of FIG. 3, these members being shown as viewed from a obliquely rearward position.
Figure 6:
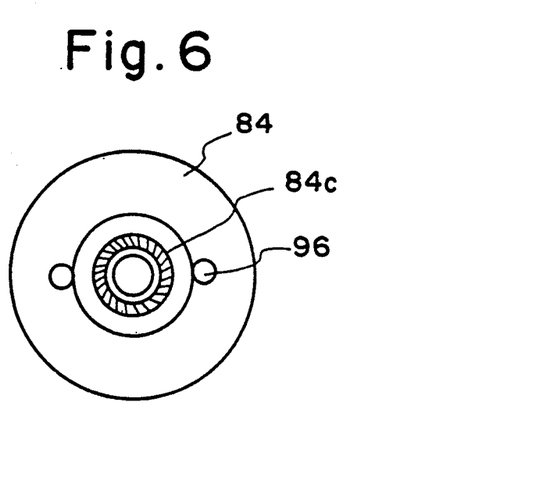
FIG. 6 is a front view of the plunger of the control valve of FIG. 3.

In order to overcome the problem described above, an oil passage 201 in the shape of a groove having a diameter through which hydraulic oil can pass is, as shown in FIG. 4, formed between the core 81 constituting the electromagnet portion 3 and the coil assembly 82.

The electromagnet portion 3 comprises the cylindrical case 55 made of a magnetic material, the case 55 accommodating a cylindrical thick wall core 81 similarly made of a magnetic material. The core 81 is disposed in such a manner that the flange portion 54 formed at an end thereof comes into contact with the flange portion 53 of the above-described valve sleeve 4. In the inner part of a cylindrical space formed between the case 55 and the core 81 there is provided a coil assembly 82 secured therein. Thus, a stationary portion is constituted by the cylindrical case 55, the core 81, and the coil assembly 82.

On the other hand, a movable portion is constituted by the push rod 38 of which cut least a portion is inserted into a hollow portion 83 of the cylindrical core 81, and a plunger 84 made of a magnetic material and secured to one end of the push rod 38, the plunger 84 being arranged to be attracted by the coil assembly 82.

Figure 7:
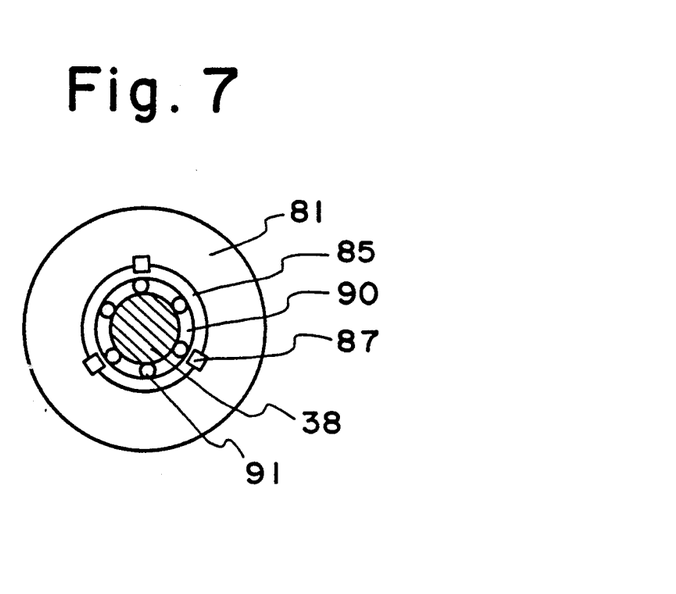
FIG. 7 is a rear view of a core portion of the control valve of FIG. 3.
Figure 8:
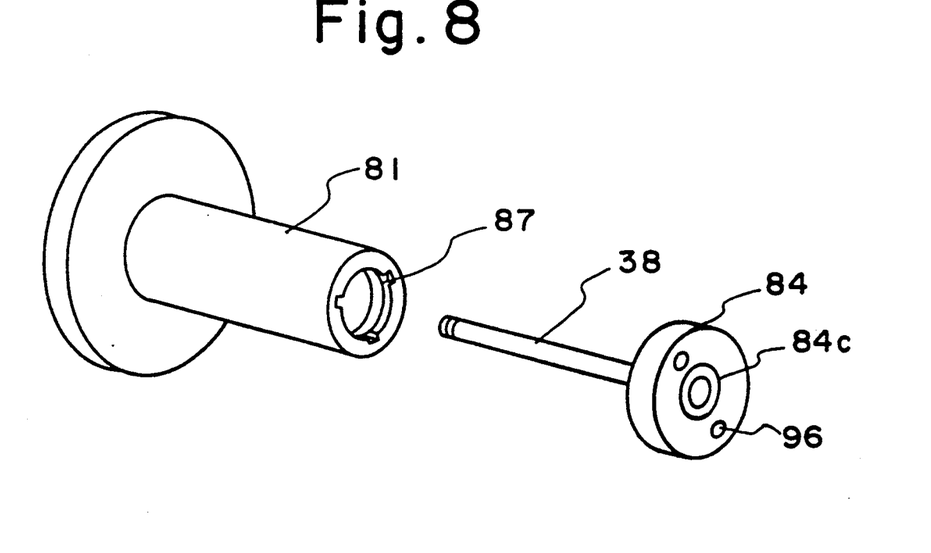
FIG. 8 is a perspective view illustrating the core and the plunger of FIG. 3, these members being shown as viewed from an obliquely forward position.

The plunger 84 secured to one end of the push rod 38, on the side opposite the pressure governing valve portion 2, is formed in a thick annular shape. The plunger 84 has a cup-shaped recess 84a formed in its center on the side confronting the core 81. The recess 84a can receive an end portion of the core 81 with a small gap kept therebetween when the plunger 84 is attracted as described above. Furthermore, an outer surface 84b of the plunger 84 faces the inner surface of the above-described case 55 with a similar small gap maintained therebetween In the hollow 83 of the core 81 there is provided a linear type rolling bearing 86 disposed via a sleeve 85. As shown in FIG. 7, after the sleeve 85 has been inserted into the hollow portion 83 of the core 81, three circumferential indents are made in an end surface of the core 81 to form retaining tabs 87 capable of retaining the sleeve 85 is formed.

The linear type rolling bearing 86 accommodated in the sleeve 85 is able to move freely within the space in the sleeve 85 between the stoppers 88 and 89. The linear type rolling bearing 86 is constituted by a brass bearing cage 90 and balls 91 accommodated in a through hole formed in the bearing cage 90, the balls 91 being arranged to slightly project over both the outer and inner surfaces of the bearing 86. The push rod 38 is supported via the thus-disposed balls 91 to enable relative rotation between the push rod 38 and the sleeve 85 is enabled.

The push rod 38 is made of a non-magnetic material, for example, stainless steel having a nitrided surface providing wear resistance. The plunger 84 is secured to the side end (the right-side end as viewed in FIG. 3) of the push rod 38 by an annular crimp, as designated by reference numeral 92. The first end of the push rod 38 which confronts the column portion 37 of the spool valve 5 has a tapered portion 93 in order to prevent erroneous assembly.

Denoted at 94 is a ring made of unwoven fabric which is inserted between an end surface of the coil assembly 82 and the flange portion 54 of the core 81. At 95 is a connector secured on the outer surface of the case 55 and at 96 is an oil-passage hole formed as a through hole in the plunger 84 in order to reduce the resistance of hydraulic oil filling the electromagnetic portion 3 and serving to prevent hydraulic pressure vibrations at high temperature.

A cover member 97 closes that end of the case 55 at which the plunger 84 is located. A cylindrical portion 99 projects from the central portion of the cover member 97, and it has a through hole 98 whose inner periphery is threaded. A screw member 100 whose outer periphery is threaded is aligned with the through hole 98, and it is threaded therein so as to enable adjustment. Thus, the tip of the screw member 100 is in control with the right end of the push rod 38, thereby enabling the adjustment of the position of the push rod 38.

When the electromagnet portion 3 is assembled, the core 81 to which the ring 94 and the coil assembly 82 are attached is inserted into the case 55 from one end and the flange portion 54 of the core 81 is positioned and secured within the stepped portion 57 formed on an end of the inner surface of the case 55 to form the stationary portion.

The plunger 84 is fitted on one end of the push rod 38 before being secured by an annular crimp 92 whereby the movable portion is formed. Then, the stopper 89 is inserted, and the first portion of the push rod 38, constituting the movable portion, is inserted from the opposite end of the case 55, so as to be received in the linear type rolling bearing 86 and sleeve 85.

Then, the flange portion 53 formed at one end of the valve sleeve 4 of the pressure governing valve portion 2 and the stopper 88 are inserted into the case 55, abutting one end side of the electromagnet portion 3. Then, the end portion 56 of the case 55 is bent on curled over the outer surface of the flange portion 53 of the valve sleeve 4. As a result, the assembly of the pressure control valve 1 is completed.

As a result of the structure according to the present invention as described above, when a hydraulic pressure fluid such as hydraulic pressure oil is supplied to the supply port 21 of the valve sleeve 4 from a pump or the like, the hydraulic oil from the supply port 21 then enters the space between the land portions 31 and 32 of the spool valve 5 via an opening formed between the valve sleeve 4 and the land portion 31 of the spool valve 5. Then, the hydraulic pressure oil passes through the output port 22 of the valve sleeve 4 which always remains in connection with the space between the two land portions 31 and 32 before being supplied to various hydraulic pressure apparatuses in the hydraulic pressure system such as an automatic transmission.

Pressure P of the hydraulic oil output through the output port 22 is simultaneously fed back via the feedback oil passage 36. Pressure P is transmitted to the closed space 35 formed by the land portion 31, the small-diameter land portion 33 which is formed next to the land portion 31, and the valve sleeve 4 so that it is applied to the land portion 31 and the small-diameter land portion 33. As a result, an output pressure feedback load is generated which corresponds to the area difference $A_1 - A_2$ given by subtracting cross sectional area $A_2$ of the small-diameter land portion 33 from cross sectional area $A_1$ of the land portion 31.

A force $(A_1-A_2)P$ generated by the feedback pressure described above is added to force $F_{SP}$ which is the urging force caused by the spring 6. Thus, the spool valve 5 is forced to the right when viewed in the drawing with a synthesized force $(A_1-A_2)P+F_{SP}$. As a result, the spool valve 5 moves to displace its position in the valve sleeve 4 to the position at which the above-described synthesized force balances with force $F_{SOL}$ generated by the electromagnet portion 3.

As a result of the movement of the spool valve 5, the land portions 31 and 32 move so that the supply port 21 and the exhaust port 23 of the valve sleeve 4 are controlled in such a manner that they are opened/closed at a predetermined rate with respect to the output port 22. As a result, control is so conducted that output pressure P at the output port 22 holds to the following equation in response to an electromagnetic signal input to the electromagnet portion 3:

$$P=(F_{SOL}-F_{SP}) / (A_1-A_2)$$

The construction of essential parts of the control valve according to the present invention will now be described in detail with reference to FIGS. 3 to 11.

According to the present invention, the gradient of the attractive force of the solenoid with respect to stroke is preselected and a mechanism for adjusting the axial position is provided so as to compensate for variations between products in current vs. hydraulic pressure characteristic.

First, the setting of the gradient of the attractive force of the solenoid with respect to stroke will be explained.

Figure 9:
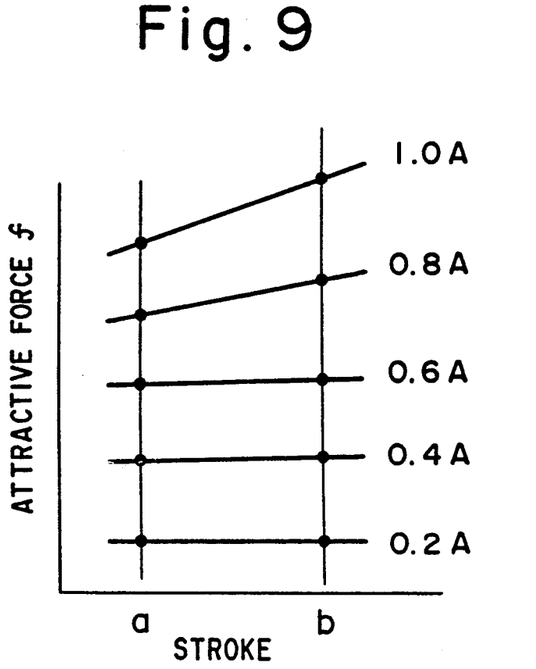
FIG. 9 is a graph showing the characteristic achievable by the present invention in the relationship between the stroke and the attractive force, with the current being used as the variable parameter.

A certain characteristic, such as that shown in FIG. 9 is to be obtained, in which the axis of abscissa represents the stroke position of the push rod 38, and the axis of ordinate represents attractive force f acting on the plunger 84, with current i supplied to the solenoid serving as the variable parameter. With such a characteristic, different stroke positions a and b have a small difference in gradient when plotted as shown in FIG. 10, thus enabling variations in current vs. attractive force characteristic to be restricted to an allowable range of variations that is between the broken lines shown in the drawing. In this way, allowance for variations between products can be directly achieved by adjusting stroke position.

Figure 11A:
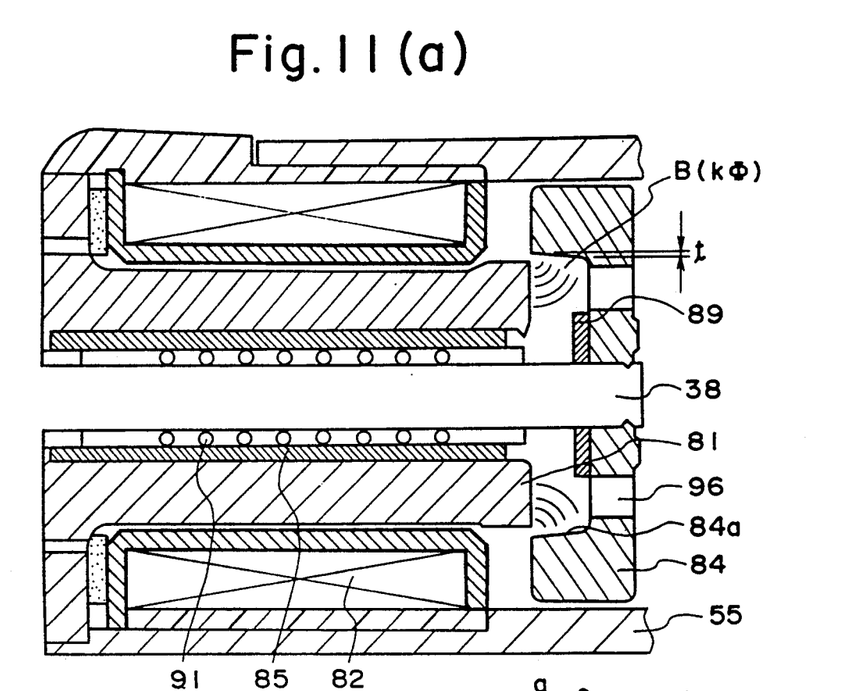

In order to achieve such a characteristic, in this embodiment, the cup-shaped plunger 84 having the recessed portion 84a confronts the cylindrical core 81, as shown in FIGS. 3 and 5, with the inner peripheral surface of the recessed portion 84a having a taper t (see FIG. 11) so that that the inner diameter decreases toward the bottom of the recess portion 84a. Thus, the inner peripheral surface of the cup-shaped plunger 84 is formed with a tapering surface which converges toward the bottom of the cup-shape.

The operation of the pressure control valve having the above-described arrangement will be explained with reference to FIGS. 11 (a) and (b).

As shown in FIG. 11 (a), when the coil assembly 82 is energized, flux is generated between the core 81 and the plunger 84, thereby generating magnetically attractive force.

The force F by which the electromagnet attracts the plunger 84 is expressed as the following:

$$F \approx B^2 A/2 \mu 0$$
$$\approx (\mu 0 \, A/8)(NI/x)^2$$
$$= K_F(I/x)^2$$

where B: flux density, A: magnetic pole area, $\mu 0$: vacuum magnetic permeability, N: number of turns, I: current, x: gap (distance between electromagnet and object), $K_F$: $(\mu 0 \, A/N^2)/8$ When the current I is $i_1$, the resultant attractive force F is $K_F(i_1/x)^2$. Since the actual gap x is relatively large, the attractive force F is small by a corresponding degree. However, the entire surface of the plunger 84, except the portion occupied by the stopper 89 (which is made of a non-magnetic material such as brass) within the recess 84a, confronts the core 81, and the magnetic pole area A is large by a corresponding degree. The attractive force F is therefore larger than that which would solely result from the relatively large gap x.

Figure 11B:
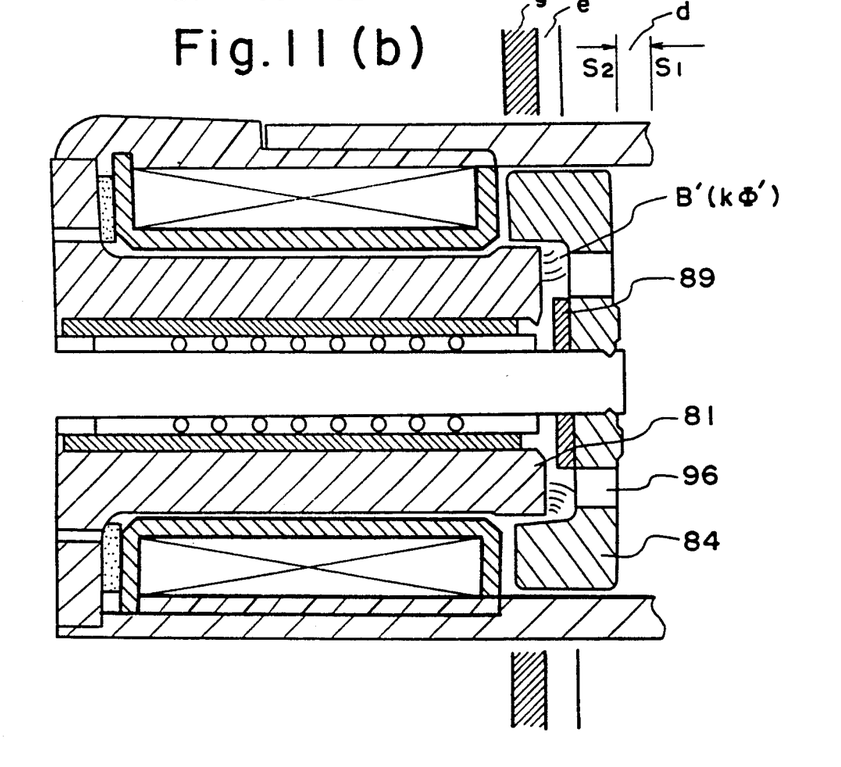

When the stroke of the push rod 38 changes from $S_1$ to $S_2$, as shown in FIG. 11 (b), while the current I changes to $i_2$, the resultant attraction force F is $K_F'(i_2/x)^2$. At this time, although the actual gap x is decreased, the region g within the magnetic pole area A does not contribute to the force acting in the axial direction of the push rod 38 to attract the plunger 84 (the region g rather acts to offset the attractive force). As a result, the attractive force F does not change much from that acting in the arrangements shown in FIG. 11 (a). In this way, the configuration of the plunger 84 is such that the magnetic resistance of the plunger 84 remains substantially constant.

The reason why the attractive force f increases slightly as the current i increases and the stroke of the push rod 38 increases, as shown in FIG. 9, is that the bottom of the recess 84a of the plunger 84 confronts and is drawn toward the end surface of the core 81. In other words, the attractive force increases as the confronting surface is drawn closer, while the force offsetting the attractive force weakens. However, the attractive force f has no tendency to increase insofar as the current is at a low level, approximately ranging from 0.2 to 0.6 A.

Because the characteristic described above can be obtained by providing the mechanism for adjusting the axial position of the push rod 38 within the plunger 84, and adjusting the position of the push rod 38 easily during load balancing, these arrangements make it possible to successfully cope with variations in the current vs. attractive force characteristic between products.

Furthermore, the push rod 38, which is to form a magnetic path, is subjected to a surface treatment so that no leakage flux will occur. For instance, if a nitrided layer is formed by soft nitriding, the push rod 38 possesses properties equivalent to those of a non-magnetic body, thereby enabling the prevention of flux leakage.

Since the brass ring-shaped stopper 89, which is a non-magnetic member, is provided at the juncture where the plunger 84 is fixed to the push rod 38, this makes it possible to limit the stroke of the plunger 84, while making it possible to prevent magnetic bridging from occurring due to contact between the cylindrical core 81 and the plunger 84.

The adjustment of the position of the push rod in the first embodiment will be described.

First, as shown in FIG. 3, the screw member 100 is screwed into the through hole 98 formed in the cylindrical portion 99 of the cover member 97, and the tip portion of the screw member 100 is brought into contact with the tip portion (on the right side as viewed in FIG. 3) of the push rod 38, so as to adjust the position of the push rod 38. After the position has been adjusted, the cylindrical portion 99 is crimped, thereby fixing the screw member 100 to the cylindrical portion 99

This simple arrangement enables the position of the push rod 38 to be adjusted. The pressure control valve is thus rendered capable of exhibiting a precise current vs. hydraulic pressure characteristic, while coping with variations between products.

The adjustment of the position of the push rod in a second embodiment will be described.

Figures 12, 13:
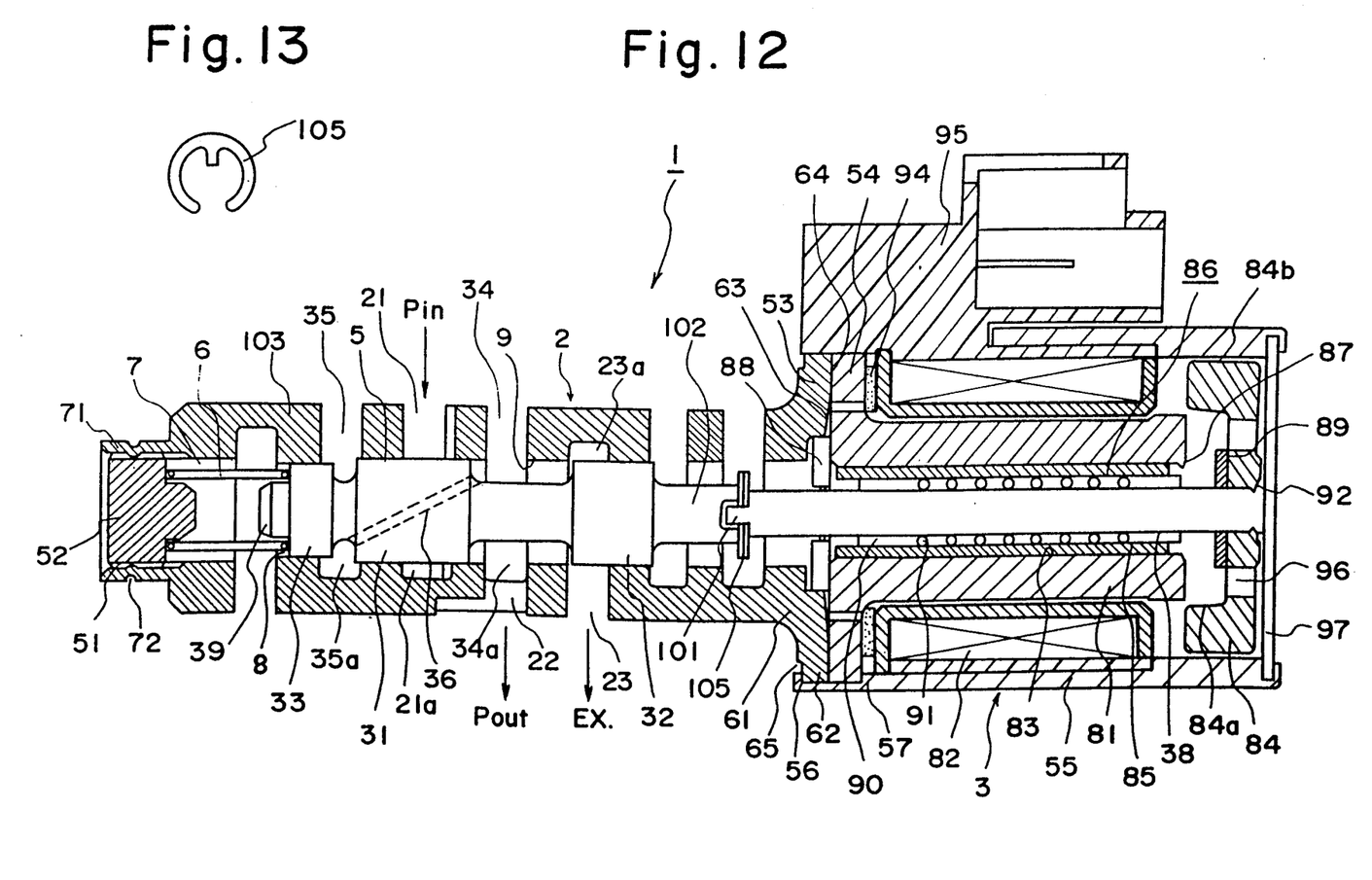
FIG. 12 is a sectional view illustrating a second embodiment of a pressure control valve according to the present invention.
FIG. 13 is a front view of an E-ring of the pressure control valve shown in FIG. 12.

As shown in FIG. 12, an E ring 105 having, as shown in FIG. 13, a substantially E-shaped configuration, that is, a generally C-shaped ring with a projection at its inner central position, is inserted between two mutually confronting tips, i.e., the tip of a column portion 102 of a spool valve 5 which is disposed at the right end of the valve sleeve 103, and the tip 101 on the left end of the push rod 38. The axial position of the push rod 38 is adjusted by this insertion. In this case, the number of the E rings 105 to be used is suitably selected so that the position adjustment is easily made.

The present invention is not limited to the above-described embodiments; other various modifications based on the spirit of the present invention are possible and they are not excluded from the scope of the present invention.

What we claim is:

1. A pressure control valve comprising:
   a valve sleeve having a support port, an output port, and an exhaust port;
   a spool valve having first and second ends and slidably mounted in said valve sleeve;
   a spring mounted under compression in said valve sleeve and bearing against said first end of said spool valve for applying a biasing force to said spool valve in a first direction;
   spring adjustment means for selectively varying the compression in said spring and said biasing force;
   an electromagnet including a cylindrical core with a central opening and a plunger mounted in said central opening for sliding movement relative to said core responsive to electromagnetic force generated by said electromagnet, said plunger being coaxial with said spool valve and having one end abutting said second end of said spool valve to urge said spool valve in a second direction;
   control means for controlling said electromagnetic force responsive to an electric signal;
   axial adjustment means, located at the point of abutment between said second end of said spool valve and said abutting end of said plunger, for receiving and retaining one or more shims for adjusting the axial spacing between said second end of said spool valve and said abutting end of said plunger; and
   an opening in said valve sleeve providing access to the point of abutment between said plunger and said spool valve.

2. A pressure control valve in accordance with claim 1 wherein said axial adjustment means comprises a central protrusion of one of said second end of said spool valve and said abutting end of said plunger and a socket receiving said protrusion in the other of said second end of said spool valve and said abutting end of said plunger.

3. A pressure control valve in accordance with claim 2 wherein said shim is mounted on said protrusion and is a C-shaped ring.

4. A pressure control valve in accordance with claim 3 wherein said C-shaped ring has a projection at its inner central position.

5. A pressure control valve in accordance with claim 2 wherein said valve sleeve has a threaded opening at one end thereof adjacent said first end of said spool valve and wherein said spring adjustment means comprises a threaded plug screwed into said threaded opening, said threaded plug having an inner end bearing against one end of said spring.

6. A pressure control valve in accordance with claim 1 wherein said shim is a C-shaped ring.

7. A pressure control valve in accordance with claim 6 wherein said C-shaped ring has a projection at its inner central position.

8. A pressure control valve in accordance with claim 1 wherein said valve sleeve has a threaded opening at one end thereof adjacent said first end of said spool valve and wherein said spring adjustment means comprises a threaded plug screwed into said threaded opening, said threaded plug having an inner end bearing against one end of said spring.

* * * * *